2,787,568
ADHESIVE COMPRISING ALKENYL DIGLYCOL CARBONATE

Francis F. Koblitz, Fitchburg, Wis., assignor to Bjorksten Research Laboratories, Inc., Fitchburg, Wis., a corporation of Illinois No Drawing. Application March 14, 1956,
Serial No. 571,577

14 Claims. (Cl. 154—43)

This invention relates to improved adhesives comprising a mixture of vinyl polysiloxane together with a co-polymer of allyl diglycol carbonate which are especially suitable for adhering glass, metals, and acrylic resins to one another.

Improved adhesives having superior properties for bonding various materials to one another have been one of the prime objects of technology for some time and improved adhesives for bonding such materials as glass, metals, and acrylic resins to one another are especially desired. I have discovered an improved adhesive of this sort which comprises primarily the co-polymer of an alkenyl diglycol carbonate with another synthetic resin monomer.

This application is a continuation-in-part of application Serial No. 362,411, filed June 17, 1953, now Patent No. 2,774,697, entitled "Adhesive Comprising Alkenyl Diglycol Carbonate."

It is therefore an object of this invention to provide improved adhesives and especially adhesives which are particularly suitable for bonding such materials as glass, metals, and acrylic resins to one another.

Another object is such adhesives comprising an alkenyl diglycol carbonate.

Further objects will become apparent as the following detailed description proceeds in which it is my intention to illustrate the applicability of the invention without limiting it to less than its full scope including all equivalents.

The following examples are presented to illustrate the invention.

Example 1

25 parts allyl diglycol carbonate (monomeric)
1 part benzoyl peroxide
25 parts methylmethacrylate (monomeric)
.25 part vinylpolysiloxane The first two ingredients were mixed and heated 20 minutes at 80° C. The third ingredient was then added and the mixture was thoroughly agitated and then heated for an additional 10 minutes at 80° C. The fourth ingredient was then added with agitation and the solution was then cooled quickly to room temperature. A layer of the resulting material is used as an adhesive between pairs of blocks of the following materials, respectively

| Sample | 1st Block | 2nd Block |
|---|---|---|
| 1 | polymethylmethacrylate | polymethylmethacrylate. |
| 2 | glass | glass. |
| 3 | aluminum | aluminum. |
| 4 | glass | Do. |
| 5 | polymethylmethacrylate | Do. |
| 6 | do | glass. |

Each of these samples thus prepared is heated two days at 80° C. or 3 hours at 70° C. and 16 hours at 120° C. to cure the adhesive by completion of the co-polymerization. The adhesion at room temperature in each case is strong or extreme.

Adhesion was also determined at 140° C., 160° C., 180° C. and 220° C. and though noticeably reduced from adhesion at room temperature, the adhesion was still found to be excellent.

The same procedure was repeated with no vinylpolysiloxane .25 part (.05%), 0.05 part (.1%), 0.25 part (.5%), 0.5 part (1.0%) and 2.5 parts (5%) vinylpolysiloxane. The adhesion of the samples prepared with no vinylpolysiloxane and 5 parts vinylpolysiloxane was noticeably less than for the other compositions, especially at the elevated temperatures.

Example 2

A room temperature curing adhesive is prepared by adding 1% of cobalt naphthenate to the material prepared according to Example 1. Samples corresponding to samples 1 to 6 are prepared utilizing this solution as an adhesive and each of the samples is cured 18 hours at room temperature and 1 hour at 80° C. Suitable adhesion is observed in each case. Each sample withstands immersion in boiling water for more than 2 hours.

Adhesion is also determined at 400° F. and found to be excellent though less than the adhesion at room temperature.

Example 3

Samples corresponding to samples 1, 2 and 4 are prepared from the material used in Example 1 and cured by exposure to ultra-violet light for 24 hours.

Example 4

25 parts by weight of allyl diglycol carbonate are mixed with 25 parts of ethylmethacrylate and 1 part of benzoyl peroxide .05 part (.1%) vinylpolysiloxane. This mixture is heated 5 minutes at 80° C. under a carbon dioxide atmosphere. Samples corresponding to samples 1 to 6 in Example 1 are prepared and polymerized by heating 2 days at 80° C. Duplicate samples are polymerized by ultra-violet light, with the exception of a counterpart of sample 3 in Example 1. Adhesion of samples corresponding to samples 1 to 6 in Example 1 is determined at 400° F. and found to be excellent.

Example 5

25 parts by weight of butyl methacrylate are mixed and reacted with 25 parts by weight of allyl diglycol carbonate and 1 part of benzoyl peroxide and 0.025 part (.05%) vinylpolysiloxane are added as in Example 1.

Example 6

10 parts of allyl methacrylate, 15 parts of methyl methacrylate and 25 parts of allyl diglycol carbonate and 1 part of benzoyl peroxide are mixed .25 parts (.5%) vinylpolysiloxane is added as in Example 1.

Example 7

25 parts of allyl di-propylene glycol carbonate are co-polymerized with methyl methacrylate and 1 part benzoyl peroxide and mixed with 0.05 part (.1%) vinylpolysiloxane as in Example 1.

Example 8

10 parts of glycol di-methacrylate, 15 parts of ethyl methacrylate, 25 parts of allyl diglycol carbonate, .5 part (1%) vinylpolysiloxane and 1 part of benzoyl peroxide are reacted as in Example 1.

The compositions prepared in Examples 5, 6, 7 and 8 are tested as adhesives between polymethylmethacrylate blocks, between glass blocks and between aluminum blocks at temperatures above and below 400° F. as in Example 1 and adhesion determined to be excellent.

Other metals which may be used include iron, steel, nickel and possibly tin and zinc. Copper and lead inhibit polymerization somewhat.

Other resins which may be incorporated in the composition include allyl di-propylene glycol carbonate, allyl di-butylene glycol carbonate, allyl di-pentylene glycol carbonate, allyl diglycol carbonate, vinyl diglycol carbonate, that is, alkenyl di-polymethylene glycol carbonates.

Other resins for co-polymerizing with said carbonate resins include ethyl methacrylate, butyl methacrylate, cyclohexyl methacrylate, other alkyl methacrylates, vinyl methacrylate, glycol di-methacrylate, allyl methacrylate, methyl α-chloroacrylate, other alkyl α-chloroacrylates, alkyl acrylates, dimethacrylate esters of polyethylene glyocols and allyl ethers of polyethylene glycols.

The invention relates preferably to preparing a co-polymer from a monomer having the formula:

$$O-(CH_2)_n-O-CH_2-CH=CH_2$$
$$|$$
$$C=O$$
$$|$$
$$O-(CH_2)_n-O-CH_2-CH=CH_2$$

where $n$ may be from 2 to 7, and a monomer having the formula:

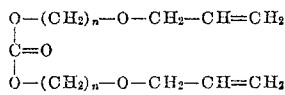

wherein R is —H, —Cl, —Br or —CH$_3$ and R$_1$ is an aliphatic radical containing from one to seven carbon atoms.

It may thus be seen that the addition of from .05% to about 1.0% of vinylpolysiloxane as a reactant in preparing the adhesive composition of the invention provides adhesives which satisfactorily retain adhesive properties at 400° F.

Butoxy methyl methacrylate or butyl maleate have been found to act satisfactorily as internal plasticizers when added to the compositions of the invention in the suitable amounts.

Thus it may be seen that the invention is broad in scope and is not to be limited except by the claims.

Having thus disclosed my invention, I claim:

1. As a composition of matter, a mixture of co-polymer formed from a monomer having the formula:

$$O-(CH_2)_n-O-CH_2-CH=CH_2$$
$$|$$
$$C=O$$
$$|$$
$$O-(CH_2)_n-O-CH_2-CH=CH_2$$

where $n$ may be from 2 to 7, and a monomer having the formula:

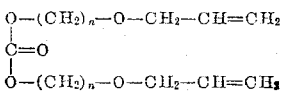

wherein R is selected from —H, and —CH$_3$ and R$_1$ is an aliphatic hydrocarbon radical containing from one to seven carbon atoms and vinyl polysiloxane in the amount of about from .05 to 1.0% of the amount of said co-polymer.

2. The composition of claim 1 wherein said aliphatic radical is saturated.

3. The composition of claim 1 wherein said aliphatic radical is unsaturated.

4. The composition of claim 2 wherein said aliphatic radical is methyl.

5. The composition of claim 2 wherein said aliphatic radical is ethyl.

6. The composition of claim 2 wherein said aliphatic radical is cyclohexyl.

7. The composition of claim 3 wherein said aliphatic radical is allyl.

8. Two articles adhesively bonded together with the composition of claim 1.

9. Two articles adhesively bonded together with the composition of claim 2.

10. Two articles adhesively bonded together with the composition of claim 3.

11. Two articles adhesively bonded together with the composition of claim 4.

12. Two articles adhesively bonded together with the composition of claim 5.

13. Two articles adhesively bonded together with the composition of claim 6.

14. Two articles adhesively bonded together with the composition of claim 7.

References Cited in the file of this patent

UNITED STATES PATENTS

| | | |
|---|---|---|
| 2,420,911 | Roedel | May 20, 1947 |
| 2,481,349 | Robie | Sept. 6, 1949 |
| 2,635,059 | Cheronis | Apr. 14, 1953 |
| 2,639,276 | Smith-Johannsen et al. | May 19, 1953 |